United States Patent [19]

Blum et al.

[11] Patent Number: 5,004,779

[45] Date of Patent: Apr. 2, 1991

[54] PROCESS FOR THE PREPARATION OF AQUEOUS, OXIDATIVELY DRYING ALKYD RESINS AND THEIR USE IN OR AS AQUEOUS LACQUERS AND COATING COMPOUNDS

[75] Inventors: Harald Blum, Wachtendonk; Jürgen Meixner, Krefeld; Manfred Schreckenberg, Krefeld; Lothar Fleiter, Krefeld; Wolfgang Wellner, Bergisch-Gladbach, all of Fed. Rep. of Germany

[73] Assignee: Bayer Aktiengesellschaft, Leverkusen, Fed. Rep. of Germany

[21] Appl. No.: 462,785

[22] Filed: Jan. 10, 1990

[30] Foreign Application Priority Data

Jan. 17, 1989 [DE] Fed. Rep. of Germany ....... 3901190

[51] Int. Cl.$^5$ ..................... C08G 63/76; C08G 63/48; C08G 18/42; C09D 3/72
[52] U.S. Cl. .................................... 524/591; 106/252
[58] Field of Search ................ 106/252; 524/591, 440

[56] References Cited

U.S. PATENT DOCUMENTS

| Re. 30,612 | 1/1981 | Harris et al. | |
|---|---|---|---|
| 3,379,548 | 4/1968 | Jen | 106/252 |
| 3,412,054 | 11/1968 | Milligan et al. | 106/28 |

FOREIGN PATENT DOCUMENTS

0017199  2/1980  European Pat. Off. .

OTHER PUBLICATIONS

Patent Abst. of Japan, JP-A-59030235, 17.02.1984.

*Primary Examiner*—William R. Dixon, Jr.
*Assistant Examiner*—C. Melissa Bonner
*Attorney, Agent, or Firm*—Connolly and Hutz

[57] ABSTRACT

A process is disclosed for preparing aqueous, oxidatively-drying alkyd resins. The resins are useful as binders in aqueous lacquers and coating compositions.

8 Claims, No Drawings

PROCESS FOR THE PREPARATION OF AQUEOUS, OXIDATIVELY DRYING ALKYD RESINS AND THEIR USE IN OR AS AQUEOUS LACQUERS AND COATING COMPOUNDS

This invention relates to a new process for the preparation of aqueous, oxidatively drying alkyd resins having a high solids content and to their use in or as oxidatively drying aqueous lacquers and coating compounds.

The conversion of polyhydroxyl compounds such as polyesters or alkyd resins into water dilutable binders containing saponification resistant carboxyl groups by their reaction with diisocyanates and a compound containing at least two isocyanate reactive groups and at least one group capable of anion formation is already known.

U.S. Pat. No. 3,412,054 describes inter alia the use of 2,2-bis-(hydroxymethyl)-propionic acid as a compound having two isocyanate reactive groups and one group capable of anion formation for the preparation of aqueous polyurethane dispersions containing drying fatty acids. According to the said U.S. patent specification, dimethylol propionic acid is incorporated in an alkyd resin by esterification by way of its hydroxyl groups and this esterified alkyd resin is then reacted with diisocyanates. It is stated in EP-A-0 017 199 that this process results in products which are not uniform, dry relatively slowly and have unconvincing lacquer technical properties.

EP-A-0 017 199 describes oil modified, carboxyl group-containing polyurethane dispersions which have improved properties and are prepared, for example, from a transesterification product of a natural oil and a polyol, e.g. soya bean oil and pentaerythritol, and a prepolymer containing isocyanate groups, e.g. the reaction product of tolylene diisocyanate and dimethylol propionic acid.

This means that it is necessary to prepare two relatively high molecular weight preliminary products which must then be reacted together in a dilute organic solution, e.g. in acetone.

The acetone must subsequently be removed by distillation and replaced by a solubilizing liquid such as butyl glycol if sufficient storage stability and good lacquer technical properties are to be obtained. The removal of acetone by distillation and its subsequent recovery result in an undesirable increase in the cost of these products. In the examples given in EP-A-0 017 199, the oil modified, carboxyl functional polyurethanes still have isocyanate contents of from 0.5 to 0.9% after the reaction of the polyol with the polyisocyanate prepolymer but these isocyanate groups are not used deliberately for chain lengthening; instead, they are liable to react with the butyl glycol used as cosolvent and/or to undergo unspecified reactions with water or ammonia when the polyurethanes are dispersed, As a result, the products obtained vary considerably according to the reaction conditions and have unforeseeable properties.

Apart from these disadvantages associated with the method of preparation of these binders, another aspect has moved into the foreground in recent times, namely the growing environmental awareness and consequent increased demands on the lacquer industry.

The binders known in the art, which contain from 10 to 15% of organic solvents in the finished lacquer, can no longer satisfy the stricter demands for environmental friendliness of lacquers.

The products described in EP-A-0 017 199 not only contain a high proportion of organic solvents but in their aqueous form they have a solids content of only about 25%.

Modern high quality aqueous alkyd resins are, however, required to have solids contents above 40% in addition to their superior lacquer technical properties and to contain only a low proportion of organic auxiliary solvents. In addition, these products should be economically producible.

It was therefore an object of the present invention to overcome the above mentioned disadvantages of the state of the art and to develop an economical process for the preparation of aqueous, oxidatively drying alkyd resins, which process would be suitable for the production of high quality top coat lacquers and could be used for aqueous alkyd resins which would have solids contents greater than 40% and contain less than 10%, preferably less than 7% of organic auxiliary solvents.

It was surprisingly found that this problem could be solved by the process according to the invention described below. The process according to this invention is a one-shot process resulting in aqueous binders having a solids content above 40% by weight and an auxiliary solvent content below 10% by weight suitable for the production of high quality coatings.

This invention relates to a process for the preparation of aqueous, oxidatively drying alkyd resins having a solids content above 40% by weight, characterised in that (a) from 70 to 88% by weight of an alkyd resin having a hydroxyl number from 100 to 200 and an acid number of at the most 5, prepared by the reaction of
  (a1) from 40 to 70% by weight of a monocarboxylic acid component consisting to an extent of at least 60% by weight of at least one unsaturated fatty acid capable of oxidative drying,
  (a2) from 7 to 20% by weight of a dicarboxylic acid component consisting of at least one dicarboxylic acid and/or at least one dicarboxylic acid anhydride,
  (a3) from 0 to 10% by weight of a diol component and
  (a4) from 14 to 30 % by weight of at least trifunctional polyol component
  in which the percentages of components (a1) to (a4) add up to 100 are reacted in a one-shot synthesis with
(b) from 4 to 7% by weight of a 2,2-bis(hydroxymethyl)-alkane carboxylic acid and
(c) from 10 to 23% by weight of a diisocyanate component consisting of at least one organic diisocyanate in the molecular weight range of from 168 to 294 in a 70 to 95 % by weight organic solution by introducing components (a) and (b) into the reaction vessel, homogenizing them with suitable organic solvents and then reacting them with component (c) at temperatures from 50° to 120° C. in the presence of from 0.01 to 2.5% by weight of suitable catalysts to produce a resin having a molecular weight Mw of from 10,000 to 70,000 and an acid number of from 18 to 36, which resin still contains free hydroxyl groups but no longer contains isocyanate groups. The reaction mixture, in which the percentages of starting components (a) to (c) mentioned above add up to 100, is then dispersed or dissolved in water and from 45 to 100% of the carboxyl groups which have been introduced into the reaction product are converted into carboxylate groups by the addition of a base during the reaction or during the process of dispersing or dissolving the reaction mixture.

The invention further relates to the use of the binders obtainable by this process in or as aqueous lacquers and coating compounds capable of drying oxidatively at room temperature.

The term "alkyd resin" is used in the context of this invention to denote polycondensates prepared from alcohols and carboxylic acids by known processes of polycondensation as described e.g. in The Chemistry of Organic Filmformers by D.H. Solomon, pages 75 to 101, John Wiley & Sons Inc., New York, 1967.

The particulars given below concerning the acid numbers apply both to free and to neutralized carboxyl groups as present in the alkyd resins (a) or in the products of the process according to the invention. The determination of the acid numbers by titration with potassium hydroxide also covers carboxyl groups which are generally neutralized with comparatively weak bases (carboxylate groups).

The alkyd resins (a) used in the process according to the invention have a hydroxyl number from 100 to 200, preferably from 140 to 190, and an acid number of at the most 5, preferably not more than 3. They are prepared by a reaction known per se of the above mentioned starting components (a1) to (a4) optionally carried out with the aid of conventional esterification catalysts, preferably as a solvent free or azeotropic condensation at temperatures of 180° to 240° C. with elimination of water.

Starting component (a1) is a monocarboxylic acid component consisting of at least one monocarboxylic acid in the molecular weight range of from 122 to 340 with the proviso that at least 60% by weight of component (a1) consist of at least one oxidatively drying fatty acid. The following are examples of suitable monocarboxylic acids: benzoic acid, tert.-butyl benzoic acid, hexahydro benzoic acid and saturated fatty acids such as 2-ethyl-hexanoic acid; coconut oil fatty acid, soya bean oil fatty acid, wood oil fatty acid, safflower oil fatty acid, castor oil fatty acid, ricinene fatty acid, ground nut oil fatty acid, tall oil fatty acids and conjuene fatty acids.

Component (a2) is at dicarboxylic acid component consisting of at least one organic dicarboxylic acid in the molecular weight range of from 116 to 600 and/or at least one anhydride of such a dicarboxylic acid. The following are suitable dicarboxylic acids or anhydrides: phthalic acid (anhydride), isophthalic acid, terephthalic acid, tetrahydrophthalic acid (anhydride), hexahydrophthalic acid (anhydride), maleic acid (anhydride), fumaric acid, adipic acid, succinic acid (anhydride), dimeric fatty acid and sebacic acid.

Component (a3) is a diol component consisting of at least one dihydric alcohol in the molecular weight range of from 62 to 400. The following are examples of suitable diols: ethylene glycol, 1,3- and 1,2-propylene glycol, butane-1,4diol, butane-1,3-diol, butane-2,3-diol, hexane diol, diethylene glycol, triethylene glycol, hydrogenated bisphenols, 1,4-cyclohexane diol, 1,4-cyclohexane dimethanol and neopentyl glycol.

Component (a4) is a polyol component which is at least trifunctional consisting of at least one at least trihydric preferably tri or tetrahydric alcohol in the molecular weight range of from 92 to 300. Trimethylol propane, glycerol and pentaerythritol are examples of suitable higher hydric alcohols. Component (a4) preferably consists entirely of pentaerythritol.

When azeotropic esterification is carried out, the entraining agent, which is usually isooctane, xylene, toluene or cyclohexane, is distilled off under vacuum after the reaction.

Component (b) consists of at least one 2,2-bis(hydroxymethyl)-alkane carboxylic acid having a total of at least 5 carbon atoms, preferably 2,2-bis(hydroxymethyl)-propionic acid.

Component (c) is a diisocyanate component consisting of at least one organic diisocyanate in the molecular weight range of from 168 to 294. The following are examples of suitable diisocyanate components: hexamethylene diisocyanate, 1-isocyanato-3,3,5-trimethyl-5-isocyanatomethyl cyclohexane (isophorone diisocyanate, abbreviated: IPDI), tolylene-2,4-diisocyanate, tolylene-2,6-diisocyanate, 2,4,4-trimethyl-hexamethylene-1,6-diisocyanate, naphthylene diisocyanate and other isocyanates, such as those described e.g. in "Methoden der organischen Chemie" (Houben-Weyl), Volume 14/2, 4th Edition, Georg Thieme Verlag, Stuttgart 1963, pages 61–70.

The process according to the invention is preferably carried out with 72.5 to 80% by weight of component (a), 4.8 to 6.5% by weight of component (b) and 14 to 21% by weight of component (c). In this preferred embodiment, the percentages again add up to 100.

The nature and proportions of starting components (a) to (c) are so chosen that the products obtained after completion of the reaction have a molecular weight Mw of from 10,000 to 70,000, preferably from 15,000 to 45,000, determined by gel permeation chromatography on calibrated styragels, an acid number from 18 to 36, preferably from 21 to 31, and a hydroxyl number of at least 40 in the absence of free isocyanate groups.

To carry out the reaction according to the invention, the alkyd resin (a), the 2,2-bis(hydroxymethyl)-alkane carboxylic acid (b) and the solvent are homogenised and the diisocyanate (c) is then added within a period from 1 minute to 2 hours at 50 to 120° C., and the reaction mixture is stirred at 80° to 140° C., making use of the heat of the exothermic reaction, until a resin having the characteristic data mentioned has been obtained.

Suitable catalysts such as dibutyl tin oxide, dibutyl tin dilaurate or triethylamine are used in quantities from 0.01 to 2 5% by weight, based on the weight of the whole reaction mixture, for accelerating the reaction and producing products which can be diluted in water.

The reaction is carried out in isocyanate-inert solvents at solids contents of from 70 to 95%. The following are examples of suitable solvents: dimethyl diglycol, N-methylpyrrolidone, N-methylcaprolactone, acetone, ethylglycol acetate or mixtures of these water dilutable solvents with other solvents, e.g. n-butyl acetate, methoxypropyl acetate, xylene, toluene or solvent naphtha.

If the quantity of residual organic solvent is required to be exceptionally low the solvent or a part of the solvent may be removed by distillation before and/or during and/or after neutralization or dispersion of the resin in water. Distillative removal of the solvent from the dispersed resin is, however, only advisable if the solvent forms an azeotropic mixture with water.

Small quantities of other organic solvents may be added after the urethanization reaction for obtaining certain properties. The following are examples of such solvents: ethanol, n-propanol, iso-propanol, n-butanol, iso-butanol, tert.-butanol, pentanol, hexanol, ocatanol, butylglycol, ethylglycol, butyl diglycol, ethyl diglycol, methyl diglycol and methoxypropanol.

The 70 to 95% resin solution is dispersed or dissolved in water and/or, if the partial or complete neutralization of the carboxyl groups has not taken place at an earlier stage, the resin solution is dispersed or dissolved in a mixture of water and neutralizing agent.

The neutralizing agents are used in the quantities required for neutralizing from 45 to 100%, preferably from 50 to 80of the groups capable of anion formation.

In particular, when tertiary amines such as triethylamine are used as neutralizing agents, they may be added before the isocyanate addition reaction since they also function as catalysts for this reaction.

The following are examples of suitable neutralizing agents: alkali metal hydroxides, ammonia, dimethylamine, diethylamine, dipropylamine, dibutylamine, trimethylamine, triethylamine, tripropylamine, tributylamine, triethanolamine, monoethanolamine, N-dimethylethanolamine, N-methylethanolamine, diethanolamine, N-methyldiethanolamine, monoisopropanolamine, diisopropanolamine, triisopropanolamine, morpholine, N-methylmorpholine, 2-amino-2-methyl-1-propanol and mixtures of such bases. Ammonia and triethylamine are particularly preferred.

The solids content of the aqueous alkyd resins thus prepared is more than 40% by weight and the organic solvent content is less than 10% by weight, preferably less than 7% by weight.

The products obtained by the process according to the invention are perfectly suitable for use as aqueous lacquers or coating compounds which undergo oxidative drying at room temperature but the usual auxiliary agents and additives used in lacquer technology are preferably added, e.g. pigments, drying accelerators, antiskinning agents, thickeners, levelling agents and antifoamants. Some of these additives may already be added to the reaction mixture before preparation of the aqueous binders if they do not interefere with the process of preparation. High quality aqueous lacquers and coating compounds capable of oxidative drying at room temperature are thus obtained. They may be applied to any substrates such as wood, paper, metal, plastics or glass by methods known per se, such as spraying, flooding, immersion, roller application, knife coating, casting or brush coating.

The lacquers dry at room temperature or under forced high temperature drying to form clear, crosslinked, glossy coatings.

The percentages given in the following examples are all percentages by weight.

EXAMPLE 1

367 g of isophthalic acid, 752 g of pentaerythritol, 1549 g of soya oil fatty acid, 774 g of conjuvandol fatty acid and 1.6 g of dibutyl tin oxide as esterification catalyst are weighed into a 5 liter reaction vessel equipped with stirrer, cooling and heating device and the reaction mixture is heated to 140° C. within one hour while nitrogen is passed through. The reaction mixture is then heated to 190° C. in 5 hours and this temperature is maintained until the acid number is approximately 2.5. The OH number of this special, low molecular weight alkyd resin is 164 and the yield is 3220 g. The reaction mixture is left to cool to 120° C., 636 g of N-methylpyrrolidone, 255 g of bis-(hydroxymethyl)propionic acid and 4.1 g of dibutyl tin dilaurate are then added and the mixture is stirred at 100° to 120° C. until homogeneous and then cooled to 75° C. 789 g of isophorone diisocyanate are then added all at once and the reaction mixture is stirred at about 110° C., making use of the heat of the exothermic reaction, until no more isocyanate groups can be detected. A highly viscous, 87% resin melt of waterdilutable alkyd resin (1) having an acid number of about 28 (100%) and still containing free hydroxyl groups is obtained. 4800 g of this 87% resin melt are dissolved in a mixture of 4760 g of water and 94 g of triethylamine. The temperature of the mixture is about 60° C. Stirring of the aqueous alkyd resin (1) is then continued for 2 hours at 50° to 60° C. and the mixture is filtered after the addition of 62 6 g of antiskinning agent ®Ascinin R conc. (Bayer AG). The aqueous alkyd resin (1) having a solids content of about 43% and a pH of about 7 is obtained. The degree of neutralization is about 50%.

EXAMPLE 2

261 g of phthalic acid anhydride, 244 g of isophthalic acid, 1562 g of soya oil fatty acid, 323 g of benzoic acid, 759 g of pentaerythritol and 85 g of 1,4-cyclohexane dimethanol r are weighed into a 5 liter reaction vessel equipped with stirrer and cooling and heating device and the contents are heated to 140° C. while nitrogen is passed through at the rate of 5 to 6 liters per hour. The reaction mixture is then heated to 220° C. in 8 hours and kept at this temperature until the acid number is ≦ 3. The OH number of this special, low molecular weight alkyd resin is 164 and the yield is 3000 g. The reaction mixture is left to cool to 80° C. and 593 g of N-methylpyrrolidone and 234 g of 2,2-bis(hydroxy-methyl)-propionic acid are then added. The reaction mixture is homogenised and 105 g of triethylamine are added. 734 g of isophorone diisocyanate are then added all at once and the reaction mixture is stirred at 100° to 110° C., making use of the heat of the exothermic reaction, until no more isocyanate groups can be detected. A highly viscous, 87% resin melt of the water dilutable alkyd resin (2) having an acid number of about 28 (100%) and still containing free hydroxyl groups is obtained.

4658 g of this resin melt are dispersed or dissolved in 4280 g of water. The mixing temperature is about 60° C. The aqueous alkyd resin (2) continues to be stirred for a further 2 hours at 50° to 60° C. and is then filtered after the addition of 58 g of antiskinning agent ®Ascinin R conc. (Bayer AG). The aqueous alkyd resin (2) is obtained with a solids content of about 44% and a pH of about 7 2. The degree of neutralization is about 60%.

EXAMPLE 3

118 g of hexahydrophthalic acid anhydride, 393 g of isophthalic acid, 1104 g of soya oil fatty acid, 442 g of ground nut oil fatty acid, 481 g of benzoic acid and 858 g of pentaerythritol are weighed into a 5 liter reaction vessel equipped with stirrer and cooling and heating device and heated to 140° C. in one hour under a stream of nitrogen. The reaction mixture is then heated to 220° C. in 8 hours and stirred until the acid number is <3. The OH number of this special alkyd resin is 170 and the yield is 3125 g. The reaction mixture is left to cool to 120° C., 313 g of N-methylpyrrolidone, 202 g of n-butyl acetate, 244 g of 2,2-bis-(hydroxymethyl)-propionic acid and 4 g of dibutyl tin dilaurate are added and the reaction mixture is homogenised and cooled to 80° C. and 795 g of IPDI are added in 1 hour. The reaction mixture is then stirred at 110° to 120° C. until no more isocyanate groups can be detected. The butyl acetate is then distilled off by passing a stronger stream of nitrogen through the mixture and butyl glycol is added to adjust the solids content to 87%. 78 g of lead octoate and 15.5 g of cobalt octoate are then added and the reaction mixture is homogenised. The resin melt is then dispersed or dissolved in a mixture of 4700 g of water and 138 g of triethylamine. The temperature 50° C. The aqueous alkyd resin continues to be stirred for 2 hours at 50 to 60° C. and is then filtered after the addition of 73 g of 20 antiskinning agent ®Ascinin R conc. (Bayer AG). The aqueous alkyd resin (3) having a solids content of about 44% and a pH of 7.0 is obtained. The degree of neutralization is about 70%.

EXAMPLE 4

182.3 g of phthalic acid anhydride, 204 6 g of isophthalic acid, 1381 g of soya oil fatty acid, 255.7 g of benzoic acid and 671 g of pentaerythritol are weighed into a 5 liter reaction vessel equipped with stirrer and cooling and heating device and heated to 140° C. in 1 hour while a stream of nitrogen is passed through. The reaction mixture is then heated to 220° C. in the course of 8 hours and kept at this temperature until the acid number is $\leq$ 3. The OH number of this special, low molecular weight alkyd resin is 173 and the yield is 2500 g. The reaction mixture is left to cool to 130° C., 360 g of n-methylpyrrolidone, 195 g of 2,2-bis-(hydroxymethyl)-propionic acid and 3 3 g of dibutyl tin oxide are then added and the mixture is homogenised and cooled to 80° C., and 620 g of isophorone diisocyanate are then added. The reaction mixture is kept at 110° to 120° C. until no more NCO can be detected. 217 g of butyl glycol, 33.2 g of ethoxylated nonyl phenol and 12.4 g of cobalt octoate are then added and the mixture is homogenised. An 85% resin melt of the water dilutable alkyd resin (4) which has an acid number of about 29 (100%) and still contains free hydroxyl groups is obtained.

The resin melt is dispersed or dissolved in a mixture of 3406 g of water and 37 g of ammonia (33%). The mixing temperature is about 60° C. The aqueous alkyd resin continues to be stirred for a further 2 hours at 50 to 60° C. and is then filtered after the addition of 51 8 g of antiskinning agent ®Ascinin R conc. The aqueous alkyd resin (4) is obtained with a solids content of 45% and a pH of about 6.8. The degree of neutralization is about 50%.

The aqueous alkyd resin binders prepared as described in the Examples according to the invention are stable in storage for at least one year at room temperature and at least six months at 40° C.

White lacquers (pigment: binder ratio =0 65:1) prepared from these alkyd resin binders have solids contents of about 45 to 65% at an application viscosity of about 25 seconds and contain about 5% of organic co-solvents.

When dried at room temperature they are tack free in 3 to 8 hours and after 24 hours drying they have good resistance to water and solvents. The binders have a high hardness/elasticity ratio and are easily applied, e.g. by spraying, immerson, casting and brush coating. The coatings have excellent film optical properties, the gloss values (20° angle) are 70 to 80%.

What is claimed is:

1. A process for the preparation of aqueous, oxidatively drying alkyd resins having a solids content above 40% by weight which comprises reacting components:
   (a) from 70 to 88% by weight of an alkyd resin having a hydroxyl number of from 100 to 200 and an acid number not greater than 5, prepared by reacting:
      (a1) from 40 to 70% by weight of a monocarboxylic acid containing at least 60% by weight of at least one unsaturated fatty acid capable of oxidative drying,
      (a2) from 7 to 20% by weight of a dicarboxylic acid component which is at least one dicarboxylic acid, at least one dicarboxylic acid anhydride, or both,
      (a3) from 0 to 10% by weight of a diol, and
      (a4) from 10 to 30% by weight of one at least trifuntional polyol component;
   (b) from 4 to 7% by weight of a 2,2-bis(hydroxymethyl)alkane carboxylic acid; and
   (c) from 10 to 23% by weight of a diisocyanate component containing at least one organic diisocyanate having a molecular weight between 168 and 294;
said process being a one-step synthesis in a 70 to 95% by weight organic solution which comprises introducing components (a) and (b) into a reaction vessel, homogenizing components (a) and (b) with organic solvent, reacting homogenized components (a) and (b) with component (c) at a temperature between 50° to 120° C. in the presence of from 0.01 to 2.5% by weight of a catalyst, whereby a resin having a molecular weight of between 10,000 to 70,000 and an acid number between 18 and 36 is obtained, which resin contains free hydroxyl groups but no free isocyanate groups, and thereafter dispersing or dissolving the reaction mixture in water to achieve a product having from 45 to 100% of the carboxyl groups in the product converted into carboxylate groups during the reaction or during the dispersing or dissolving of the reaction mixture.

2. A process according to claim 1 wherein the quantity of organic solvent in the process is controlled so that the solvent content of the product is below 10% by weight.

3. A process according to claim 1 wherein component (a4) is pentaerythritol.

4. A process according to claim 1, wherein component (b) is 2,2-dimethyol propionic acid.

5. A process according to claim 1 wherein component (c) is 1-isocyanato-3,3,5-trimethyl-5-isocyanatomethyl-cyclohexane.

6. A process according to claim 1 wherein component (a) is prepared by solvent free condensation or azeotropic condensation of reactants (a1) to (a4).

7. Aqueous, oxidatively drying alkyd resins prepared by the process of claim 1.

8. An improved aqueous lacquer or coating composition which will oxidatively dry at ambient temperatures containing an aqueous binder which comprises the aqueous, oxidatively drying alkyd resins prepared by the process of claim 1.

* * * * *